(12) United States Patent
Thomas et al.

(10) Patent No.: US 10,717,900 B2
(45) Date of Patent: Jul. 21, 2020

(54) SEALANT TAPE AND METHODS USING SEALANT TAPE

(71) Applicant: THE BOEING COMPANY, Chicago, IL (US)

(72) Inventors: Charles W. Thomas, Issaquah, WA (US); Jonathan A Santiago, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 655 days.

(21) Appl. No.: 15/144,552

(22) Filed: May 2, 2016

(65) Prior Publication Data

US 2017/0313453 A1 Nov. 2, 2017

(51) Int. Cl.
*C09J 7/00* (2018.01)
*C09J 7/38* (2018.01)

(52) U.S. Cl.
CPC ........... *C09J 7/38* (2018.01); *C09J 2201/122* (2013.01); *C09J 2201/28* (2013.01)

(58) Field of Classification Search
None
See application file for complete search history.

(56) References Cited

U.S. PATENT DOCUMENTS

| 3,455,077 | A | | 7/1969 | Guinne | |
|---|---|---|---|---|---|
| 5,370,598 | A | | 12/1994 | Corneau, Jr. | |
| 5,820,958 | A | * | 10/1998 | Swallow | E04F 13/04 428/42.2 |
| 6,124,032 | A | | 9/2000 | Bloch et al. | |
| 2007/0248817 | A1 | * | 10/2007 | Sieber | A47G 27/0437 428/343 |
| 2007/0292650 | A1 | * | 12/2007 | Suzuki | C09J 7/38 428/41.8 |
| 2009/0162595 | A1 | * | 6/2009 | Ko | B05C 5/0254 428/41.9 |
| 2011/0229694 | A1 | * | 9/2011 | Kanda | C09J 7/38 428/167 |

* cited by examiner

*Primary Examiner* — Anish P Desai
(74) *Attorney, Agent, or Firm* — Moore IP Law

(57) ABSTRACT

A sealant tape including a base portion, first sealing portion and second sealing portion is provided. The first sealing portion includes a first ridge and the second sealing portion includes a second ridge. The sealant tape is applies to a perimeter portion of a tool such that the base portion of the sealant tape couples to the perimeter of the tool, and a vacuum bag is placed over the tool, contacting the sealant tape, and ultimately is sealed onto the tool via the sealant tape.

20 Claims, 6 Drawing Sheets

SEALANT TAPE AND METHODS USING SEALANT TAPE

BACKGROUND

The present disclosure relates in general to a sealant tape and methods for using a sealant tape, including using the sealant tape for attaching a vacuum bag to a tool.

In composite part fabrication, a particular ergonomic concern is the operation of sealing vacuum bags to tools. In a typical application, a large quantity of sealant tape is applied to a tool and manually applied to the tool such that, for example, a vacuum bag may be attached and sealed to an end of the tool. In some composite part fabrication processes, including for fabricating parts relating to aircrafts, many miles of sealant tape is often needed.

Accordingly, it has been desirable to make modifications to the sealant tape to be used for different applications, such as for composite part fabrication.

SUMMARY

In some examples, a sealant tape is provided. The sealant tape includes a base portion, a first sealing portion and a second sealing portion. The first sealing portion is disposed along a length direction of the base portion, the first sealing portion having at least one first ridge. The second sealing portion is disposed along the length direction of the base portion. The second sealing portion has at least one second ridge. The at least one second ridge further includes a plurality of indentation portions that extend along a width direction of the base portion and are spaced apart in the length direction of the base portion.

In some examples, a sealant tape is provided. The sealant tape includes a base portion, a first sealing portion and a second sealing portion. The first sealing portion is disposed along a length direction of the base portion, the first sealing portion having at least one first ridge. The second sealing portion is disposed along the length direction of the base portion. The second sealing portion has at least one second ridge. The first sealing portion has a greater tackiness than the second sealing portion.

In some examples, a method for providing a vacuum bag to a tool is provided. The method includes applying a sealant tape to a perimeter portion of the tool such that a base portion of the sealant tape couples to the perimeter portion of the tool. A vacuum bag is placed over the tool such that a portion of the vacuum bag contacts the sealant tape on the tool. A pressure is applied along a first sealing portion of the sealant tape having a first tackiness and at least a first ridge, so as to seal the first sealing portion to the vacuum bag. A pressure is applied along a second sealing portion of the sealant tape having a second tackiness lesser than the first tackiness and at least a second ridge having a plurality of indentation portions, so as to seal the second sealing portion to the vacuum bag.

DETAILED DESCRIPTION

Figure 1:
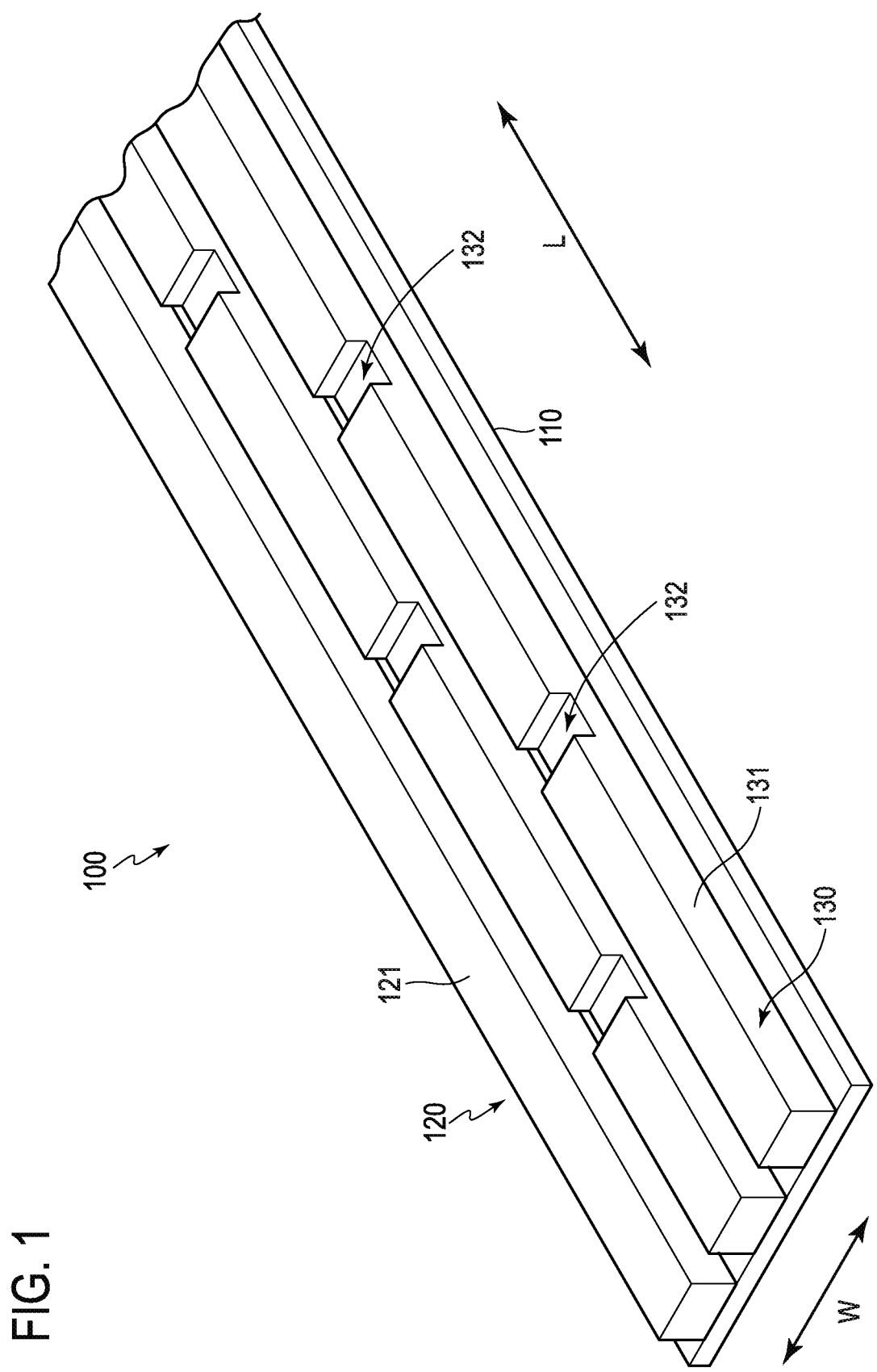
FIG. 1 is a diagram illustrating a sealant tape according to some examples.

The following detailed description of certain examples will be better understood when read in conjunction with the appended drawings. It should be understood that the various examples are not limited to the arrangements and instrumentality shown in the drawings.

Various examples provide sealant tape and methods utilizing such a sealant tape, such as for applying a vacuum bag to a tool, such as in an aircraft manufacturing process. However, it should be appreciated that various examples may be used in different applications, including in non-aircraft applications. For example, a sealant tape may be provided for a purpose other than to apply a vacuum bag to a tool. Thus, while examples relating to the sealant tape may be described in connection with applying a vacuum bag to a tool, other applications and operating environments are contemplated.

As can be seen in FIG. 1, in the illustrated example, a sealant tape 100 is provided, which in various examples includes different portions having different sealing properties, including different levels of tackiness to allow for easier and improved application of the sealant tape of an object (e.g., application to a tool end for sealing a vacuum bag thereto). The sealant tape 100 may be provided in roll form, which can be unraveled manually by a user or by machine. The roll of sealant tape 100 may include 10 feet, 20 feet, or more of the sealant tape 100. Upon unrolling a portion of the sealant tape 100, the sealant tape 100 can be applied as desired or needed. It should be appreciated that different configurations of the sealant tape 100 may be provided, including sealant tape having a different size (e.g., length and width) and shape, which may be based, for example, on the particular application.

Referring again to FIG. 1, the sealant tape 100 includes a base portion 110 which extends longitudinally along an entirety of the sealant tape in the illustrated example. The base portion 110 has a length direction L which runs along the longitudinal direction of the sealant tape. The base portion 110 also has a width direction W that is perpendicular to the length direction and runs transversely across the width of the sealant tape 100. Thus, the sealant tape 100 may be cut across the width direction to define different sizes of the sealant tape 100 along the length direction.

The sealant tape 100 includes a first sealing portion 120 that is disposed along the length direction of the base portion 110. The first sealing portion 120 may extend an entire length of the sealant tape 100, and may comprise 1%-30%, or 10%-20% of the sealant tape 100 measured along the width direction of the base portion 110. By the first sealing portion 120 comprising a relatively small amount of the sealant tape, increased speed of sealing the tape to a vacuum bag or other component along this edge can be achieved in a situation where the first sealing portion is sealed to the vacuum bag or other component as a first step.

Figure 3:
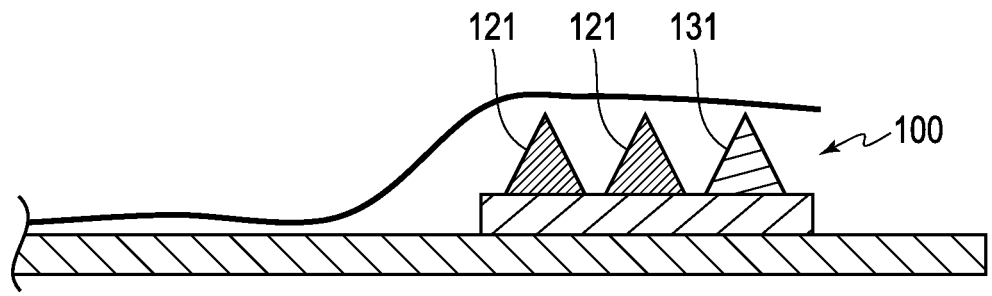
FIG. 3 is a diagram illustrating one configuration of a sealant tape.
Figure 4:
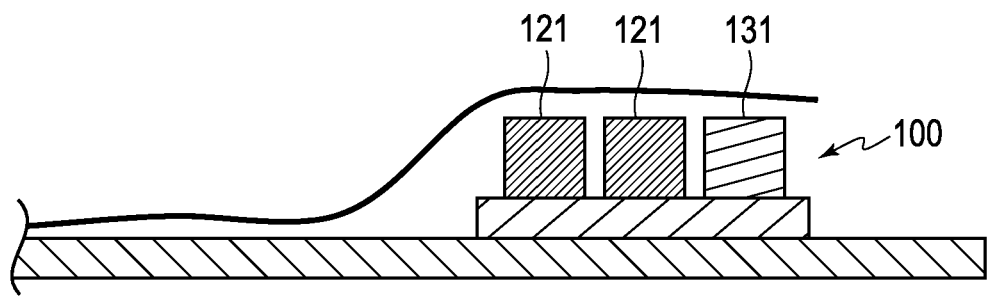
FIG. 4 is a diagram illustrating another configuration of a sealant tape.

The first sealing portion 120 includes at least one ridge 121. The ridge 121 may have no interruptions, and thus, be continuous along the entire length of the ridge 121. In some examples, such as the example shown in FIG. 1, only one ridge 121 of the first sealing portion 120 is included. However, some examples may include multiple ridges that are uninterrupted along their entire length. The ridge 121 defines a raised portion along the first sealing portion 120 that extends above the base portion 110. The ridge 121 may take different shapes and sizes, for example, having a generally triangular cross-section as illustrated in FIG. 3 or a generally rectangular cross-section as illustrated in FIG. 4. However, the ridge 121 may be changed as desired or needed.

The sealant tape further includes a second sealing portion 130 that is disposed along the length direction of the base portion. The second sealing portion may abut the first sealing portion, or may otherwise be spaced from the first sealing portion. The second sealing portion may extend an entire length of the sealant tape, and may comprise 50%-100%, or 80%-90% of the sealant tape measured along the width direction of the base portion. The second sealing portion may have a width of twice or three times, or five times, or ten times that of the first sealing portion. By comprising a relatively large amount of the sealant tape as compared to the first sealing portion, increased ease of sealing the tape to a vacuum bag or other component along this edge can be achieved in a situation where the first sealing portion is first sealed and a vacuum can be applied to the vacuum bag, which would evacuate air from the inside, forcing the bag down to the surface of the tool and allowing for the vacuum bag to be firmly pulled onto the second sealing portion 130.

The second sealing portion 130 includes at least one ridge 131. The ridge 131 may have interruptions, shown in the Figures as indentation portions 132. The second sealing portion may have a plurality of indentation portions 132 that are evenly spaced, or staggered, along some or all of the length of the second sealing portion. The plurality of indentation portions 132 extend along a width direction of the base portion 110. In some examples, the plurality of indentation portions 132 may extend substantially perpendicularly to the length direction of the base portion. The indentation portions 132 extend a depth direction into the ridge 131, which in the illustrated example is only a portion of the entire height of the ridge 131. However, in some examples the indentation portions 132 extend entirely along the height of the ridge 131 from the top to the bottom at the base portion 110. As should be appreciated, the base portion 110 does not include the indentation portions 132.

The ridge 131 may take different shapes and sizes, for example, having a generally triangular cross-section as illustrated in FIG. 3 or a generally rectangular cross-section as illustrated in FIG. 4. However, the ridge 1631 may be changed as desired or needed.

In some examples, the second sealing portion 130 has a tackiness that is less than (an amount lower than) the first sealing portion 120. Tackiness may be understood by one skilled in the art as defining an adhesive property, and thus, a portion with a greater tackiness (e.g., a higher tackiness relative to another portion) would be understood to require less pressure to adhere to an object than a portion with a lesser tackiness. Further, the second sealing portion 130 may be made of a material distinct from the first sealing portion 120. Owing at least in part to this feature, the greater tackiness of the first sealing portion 120 as compared with the second sealing portion 130 can achieve easier adhesion insofar as the outside of the sealant tape (e.g., the portion having the first sealing portion) adheres to an object first. This can allow for increased speed of sealing with an ergonomic risk reduction, such as when vacuum sealing a vacuum bag to a tool in aircraft composite fabrications processes.

In some examples, and as shown in FIG. 1, the first sealing portion 120 includes one first ridge 121, and the second sealing portion 130 includes two second ridges 131. At least in part based upon this configuration, a sealant tape with high sealing efficiency at an effective cost can be manufactured. However, the number of first ridges 121 and second ridges 131 is not particularly limited. There may exist, in some examples, a plurality of first ridges, and one second ridge or any plurality of second ridges.

In some examples, the indentation portions 132 are spaced evenly along the at least one second ridge 131, as measured along the length direction of the base portion 110. The indentation portions may be somewhat shallow in nature, such as having an indentation depth (measured with respect to the thickness of the sealant tape) in the order of millimeters or smaller. In some examples, the indentation portions may have the same depths as each other, while in other examples, the indentation portions may have varying depths.

By having evenly spaced indentation portions 132, ease of manufacturing of the sealant tape may be realized. However, in some examples, the indentation portions may be spaced at predetermined differing distances or spacings from each other as measured along the length direction of the base portion.

In some examples, the first ridge 121 and the second ridge 131 are spaced apart when viewed along the width direction of the base portion 110 as illustrated in FIGS. 3 and 4. However, in other examples, the first and second ridges may abut each other along the width direction of the base portion.

Figure 2:
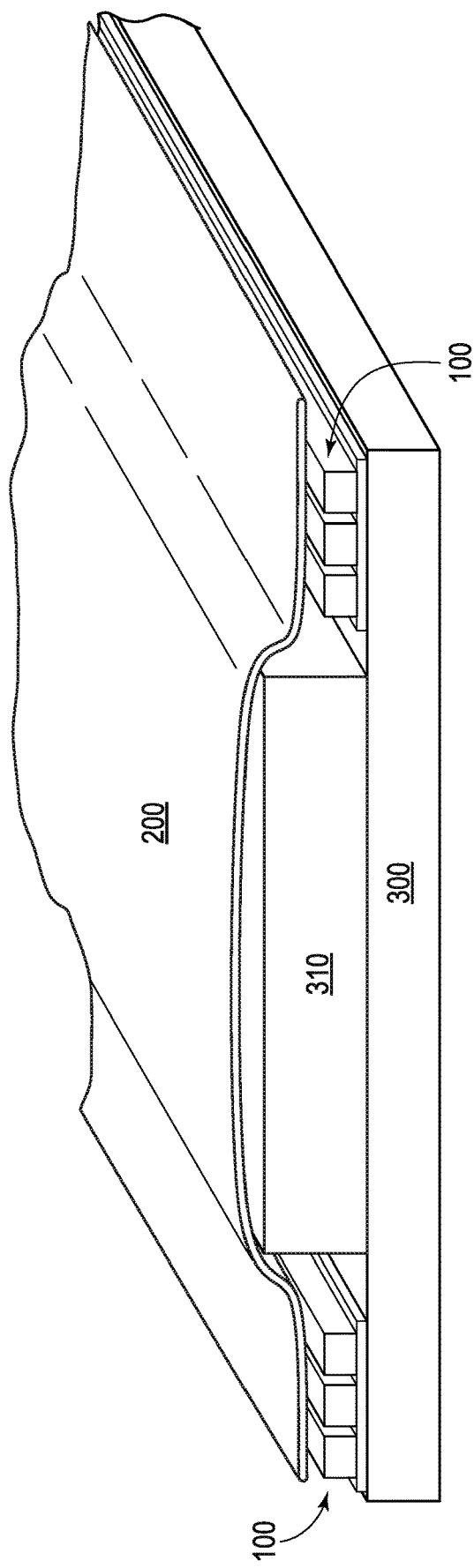
FIG. 2 is a diagram illustrating an application of a vacuum bag to a tool using a sealant tape.

Referring to FIG. 2, a vacuum bag 200 being sealed onto a tool 300 using the sealant tape 100 during a process for curing a part 310 on the tool 300 is shown. The vacuum bag 200 is sealed to the tool 300 by means of an application of the sealant tape 100 to a perimeter portion of the tool 300, such that a bottom of the base portion (110 in FIG. 1) of the sealant tape 100 (i.e., the side opposite the side with the ridges 121 and 131) couples to a surface at the perimeter of the tool 300, which is illustrated at an end portion of the tool 300. A vacuum bag 200 is then placed over the tool such that a portion of the vacuum bag will contact the sealant tape 100 on the tool 300, including the first and second sealing portions 120 and 130 and compressing the corresponding ridges 121 and 131 when a pressure is applied thereto. The second sealing portion 130 of the sealant tape 100 may be placed toward the outside edge of a tool 300, so that when the vacuum bag 200 is placed over the tool 300, little effort will be expended to roughly seal that bag down to a ridge, such as the first ridge 121 of the sealant tape 100. This can also be due to the relatively narrow width of the first sealing portion 120 and first ridge 121 as well as the relatively higher tackiness first sealing portion 120 as compared to the second sealing portion 130 and second ridge 131. For example, a pressure is applied along the first sealing portion 120 of the sealant tape, so as to seal the first sealing portion 120 to the vacuum bag 200. A pressure is applied along the second sealing portion 130 of the sealant tape, so as to seal the second sealing portion 130 to the vacuum bag 200. The pressure may be applied simultaneously, concurrently, or sequentially.

In some examples, the first sealing portion 120, similarly to the examples described with respect to FIG. 1 above, has a first ridge that is continuous in nature. The first sealing portion 120 may also have a tackiness that is greater than the tackiness of the second sealing portion 130. Further, similarly to the examples described with respect to FIG. 1 above, the second sealing portion 130 may have a second ridge that includes a plurality of indentation portions 132 (shown in FIG. 1).

Thus, in some examples, the applying of the pressure to the first sealing portion 120 may take place prior to the applying of the pressure to the second sealing portion 130. This application of pressure may allow for the greater tackiness portion of the sealant tape to be sealed first, thus increasing efficiency for the sealing procedure. Also, the applying of the pressure to either or both sealing portions may occur by means of applying a vacuum to the tool-vacuum bag structure, so as to vacuum seal the vacuum bag to the tool. In some examples, the vacuum bag 200 is manually sealed to the tool by applying pressure along the first sealing portion 120 of the tape which has been placed on the tool ridge-side up, and a vacuum will later be applied to evacuate air from the inside of the vacuum bag 200, thereby forcing the vacuum bag 200 down to the surface of the tool. By this method, a relatively small effort is necessary to manually seal the greater tackiness first sealing portion 120 to the vacuum bag 200, and the remainder of the sealant tape 100, including the second sealing portion 130 having the indentation portions 132, will have the vacuum bag 200 forced onto the vacuum bag 200 and sealed, effectively using the ridges 131 and indentation portions 132 provided in the second sealing portion 130.

In some examples, the end of the vacuum bag 200 is oriented so as to abut the first sealing portion 120. This may allow for the vacuum bag to more easily and appropriately seal to the first sealing portion 120, which may be the portion of the sealant tape that is first used during the sealing procedure.

Figure 5:
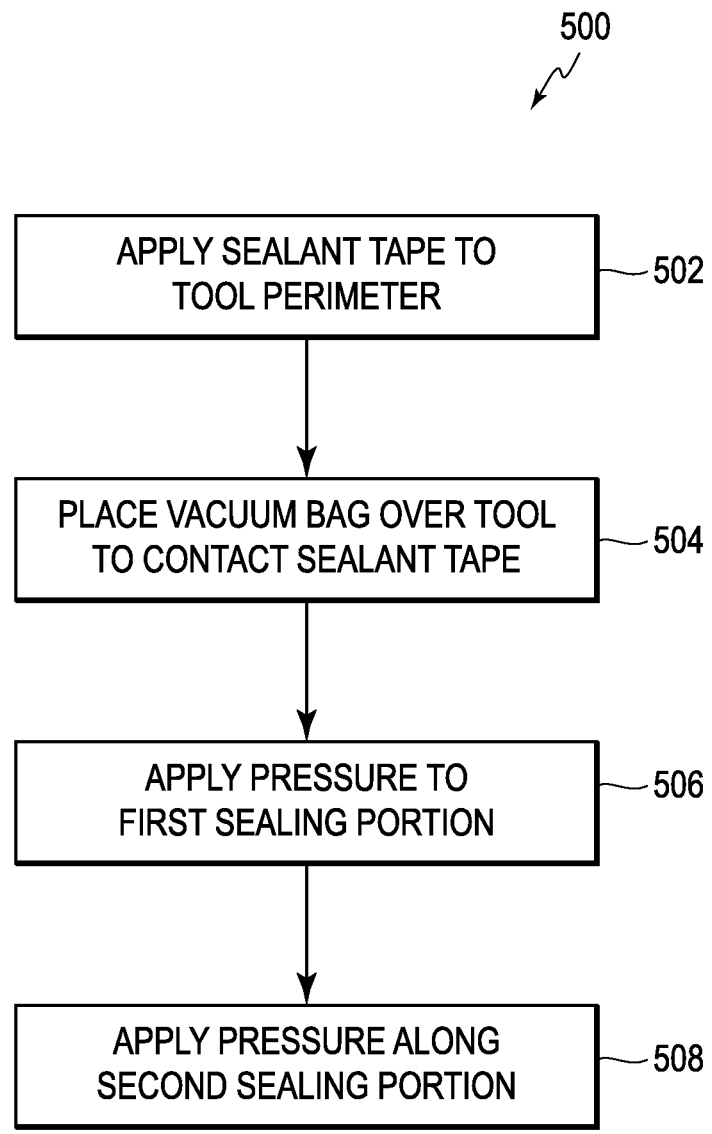
FIG. 5 illustrates a method of applying a sealant tape.

A method 500 of applying a sealant tape, such as the sealant tape 100 will now be described. As shown in FIG. 5, a method for providing a vacuum bag to a tool, includes a step 502 of applying a sealant tape to a perimeter portion of the tool such that a base portion of the sealant tape couples to the perimeter portion of the tool. Step 504 provides for placing a vacuum bag over the tool such that a portion of the vacuum bag contacts the sealant tape on the tool. Step 506 provides for applying a pressure along a first sealing portion of the sealant tape having a first tackiness and at least a first ridge, to seal the first sealing portion to the vacuum bag. Step 508 provides for applying a pressure along a second sealing portion of the sealant tape having a second tackiness lesser than the first tackiness and at least a second ridge having a plurality of indentation portions, to seal the second sealing portion to the vacuum bag.

Figure 6:
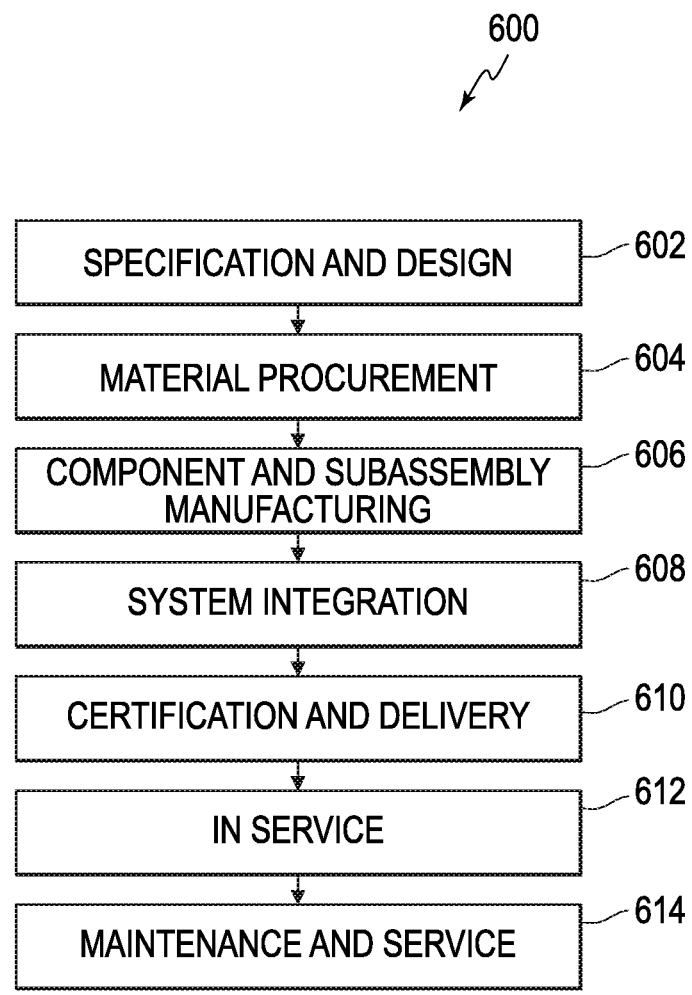
FIG. 6 is a block diagram of aircraft production and service methodology.
Figure 7:
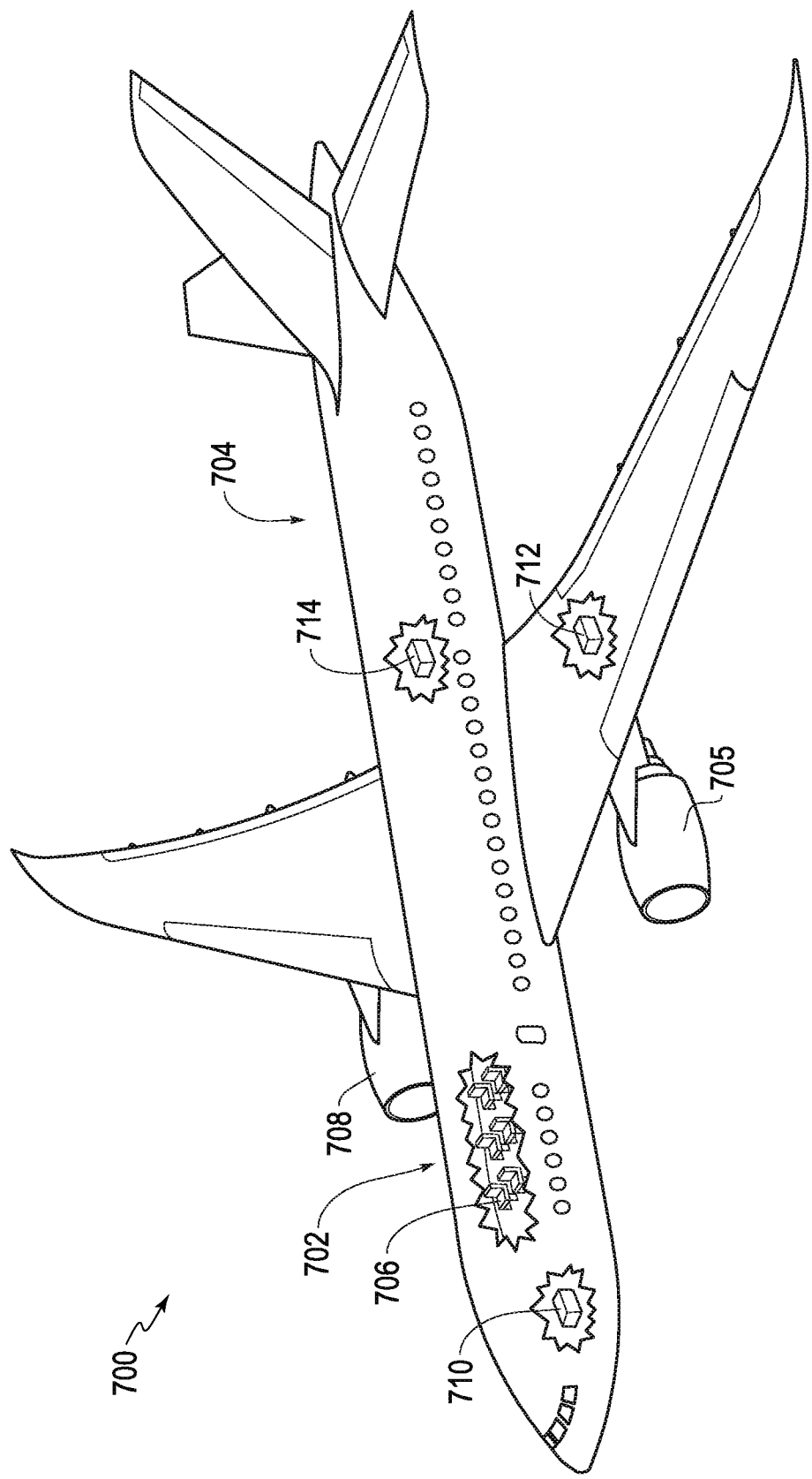
FIG. 7 is a schematic perspective view of an aircraft.

Examples of the disclosure may be described in the context of an aircraft manufacturing and service method 600 as shown in FIG. 6 and an aircraft 700 as shown in FIG. 7. That is, the disclosure may relate to composites used in the fabrication or other production of components relating to aircraft manufacturing and service. During pre-production, illustrative method 600 may include specification and design 602 of the aircraft 700 and material procurement 604. During production, component and subassembly manufacturing 606 and system integration 608 of the aircraft 700 take place. Thereafter, the aircraft 700 may go through certification and delivery 610 to be placed in service 612. While in service by a customer, the aircraft 700 is scheduled for routine maintenance and service 614 (which may also include modification, reconfiguration, refurbishment, and so on).

Each of the processes of the illustrative method 600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown FIG. 7, the aircraft 700 produced by the illustrative method 600 may include an airframe 702 with a plurality of high-level systems 704 and an interior 706. Examples of high-level systems 704 include one or more of a propulsion system 708, an electrical system 710, a hydraulic system 712, and an environmental system 714. Any number of other systems may be included. Although an aerospace example is shown, the principles may be applied to other industries, such as the automotive industry.

Apparatus and methods shown or described herein may be employed during any one or more of the stages of the manufacturing and service method 600. For example, components or subassemblies corresponding to component and subassembly manufacturing 606 may be fabricated or manufactured in a manner similar to components or subassemblies produced while the aircraft 700 is in service. Also, one or more aspects of the apparatus, method, or combination thereof may be utilized during the production states 606 and 608, for example, by substantially expediting assembly of or reducing the cost of an aircraft 700. Similarly, one or more aspects of the apparatus or method realizations, or a combination thereof, may be utilized, for example and without limitation, while the aircraft 700 is in service, e.g., maintenance and service 614.

While the above description is described with respect to a vacuum bag and tool, and generally to composite fabrication, it is to be understood that the sealant tape and methods described herein are suitable for a variety of uses, including fabrication of various structures as well as sealing of various apparatuses. The configuration of the sealant tape 100, including its length, width and thickness, can be modified to account for the requirements necessitated by the particular apparatus(es) that will be sealed.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While the dimensions and types of materials described herein are intended to define the parameters of the various examples, the examples are by no means limiting and are exemplary examples. Many other examples will be apparent to those of skill in the art upon reviewing the above description. The scope of the various examples should, therefore, be determined with reference to the appended claims, along with the full scope of equivalents to which such claims are entitled.

In the above description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range.

As used herein, the terms "system," "subsystem," "unit," or "module" may include any combination of hardware that operates to perform one or more functions. Thus, for example, one or more of the components may be implemented in a single piece of hardware or multiple pieces of hardware. It should be understood that the various examples are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one example" are not intended to be interpreted as excluding the existence of additional examples that also incorporate the recited features. Moreover, unless explicitly stated to the contrary, examples "comprising" or "having" an element or a plurality of elements having a particular property may include additional such elements not having that property.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various examples, including the best mode, and also to enable any person skilled in the art to practice the various examples, including making and using any devices or systems and performing any incorporated methods. The patentable scope of the various examples is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A sealant tape comprising:
   a base portion;
   a first sealing portion disposed on the base portion and along a length direction of the base portion, the first sealing portion having at least one first ridge, wherein the at least one first ridge has a continuous surface that does not include indentations; and
   a second sealing portion disposed on the base portion and along the length direction of the base portion, the second sealing portion having at least one second ridge and a third ridge, wherein the second sealing portion comprises a plurality of indentation portions, wherein the at least one second ridge has a first subset of the plurality of indentation portions, and wherein the third ridge has a second subset of the plurality of indentation portions.

2. The sealant tape of claim 1, wherein the plurality of indentation portions extends substantially perpendicularly with respect to the length direction of the base portion.

3. The sealant tape of claim 1, wherein the second sealing portion has a lesser tackiness than the first sealing portion.

4. The sealant tape of claim 1, wherein the second sealing portion comprises 80 percent to 90 percent of a distance along a width direction of the base portion and the first sealing portion comprises 10 percent to 20 percent of the distance along the width direction of the base portion.

5. The sealant tape of claim 1, wherein the first sealing portion comprises two first ridges.

6. The sealant tape of claim 1, wherein the first subset of the plurality of indentation portions along the at least one second ridge is evenly spaced apart in the length direction of the base portion.

7. The sealant tape of claim 1, wherein the plurality of indentation portions has varying depths.

8. The sealant tape of claim 1, wherein each indentation portion of the plurality of indentation portions has a same depth.

9. The sealant tape of claim 1, wherein the at least one first ridge and the at least one second ridge are spaced apart in a width direction of the base portion.

10. A sealant tape comprising:
    a base portion;
    a first sealing portion disposed on the base portion and along a length direction of the base portion, the first sealing portion having at least one first ridge, wherein the at least one first ridge has a continuous surface that does not include indentations; and
    a second sealing portion disposed on the base portion and along the length direction of the base portion, the second sealing portion having at least one second ridge and a third ridge, wherein the second sealing portion comprises a plurality of indentation portions, wherein the at least one second ridge has a first subset of the plurality of indentation portions.

11. The sealant tape of claim 10, wherein the plurality of indentation portions is disposed along the length direction of the base portion.

12. The sealant tape of claim 10, wherein the second sealing portion comprises 80 percent to 90 percent of a distance along a width direction of the base portion and the first sealing portion comprises 10 percent to 20 percent of the distance along the width direction of the base portion.

13. The sealant tape of claim 10, wherein the plurality of indentation portions along the second sealing portion is evenly spaced along the length direction of the base portion.

14. The sealant tape of claim 1, wherein the first subset is non-contiguous with the second subset.

15. The sealant tape of claim 10, wherein the plurality of indentation portions extends substantially perpendicularly with respect to the length direction of the base portion.

16. The sealant tape of claim 10, wherein the second sealing portion has a lesser tackiness than the first sealing portion.

17. The sealant tape of claim 10, wherein the at least one first ridge and the at least one second ridge are spaced apart in a width direction of the base portion.

18. The sealant tape of claim 10, wherein the first sealing portion comprises two first ridges.

19. The sealant tape of claim 10, wherein the first subset of the plurality of indentation portions along the at least one second ridge is evenly spaced apart in the length direction of the base portion.

20. The sealant tape of claim 10, wherein the plurality of indentation portions has varying depths.

* * * * *